United States Patent
Sun et al.

(10) Patent No.: US 11,543,534 B2
(45) Date of Patent: Jan. 3, 2023

(54) SYSTEM AND METHOD FOR THREE-DIMENSIONAL OBJECT DETECTION

(71) Applicant: Samsung Electronics Co., Ltd., Suwon-si (KR)

(72) Inventors: Lin Sun, Mountain View, CA (US); Qi Chen, Baltimore, MD (US)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 16/985,092

(22) Filed: Aug. 4, 2020

(65) Prior Publication Data

US 2021/0157006 A1     May 27, 2021

Related U.S. Application Data

(60) Provisional application No. 63/050,654, filed on Jul. 10, 2020, provisional application No. 62/939,548, filed on Nov. 22, 2019.

(51) Int. Cl.
*G06K 9/62*        (2022.01)
*G01S 17/894*      (2020.01)
(Continued)

(52) U.S. Cl.
CPC .......... *G01S 17/894* (2020.01); *G05D 1/0088* (2013.01); *G06N 3/02* (2013.01); *G06T 11/008* (2013.01); *G06T 15/00* (2013.01)

(58) Field of Classification Search
CPC ...... G01S 17/894; G05D 1/0088; G06N 3/02; G06N 3/0454; G06N 3/084; G06N 3/08;
(Continued)

(56) References Cited

U.S. PATENT DOCUMENTS 10,891,518 B1 *  1/2021   Joshi .................... H04W 4/44
10,915,793 B2 *  2/2021   Corral-Soto ............ H04W 4/38
(Continued)

FOREIGN PATENT DOCUMENTS

CN       112836564 A   *   5/2021        ........... G01S 17/894
EP        3477616 A1   *   5/2019
(Continued)

OTHER PUBLICATIONS

Zhang, Shifeng et al., "Bridging the Gap Between Anchor-based and Anchor-free Detection via Adaptive Training Sample Selection," Mar. 24, 2020, arXiv:1912.02424v3 [cs.CV], 10 pages.
(Continued)

*Primary Examiner* — Mahendra R Patel
(74) *Attorney, Agent, or Firm* — Lewis Roca Rothgerber Christie LLP

(57) ABSTRACT

A system and method for three-dimensional (3D) object classification are disclosed. A computing system receives point cloud data from an input source. The point cloud data may include first and second points in 3D space. The first point may represent a feature of an object. The computing system invokes a neural network for classifying the first point with a first label, and regresses a bounding box based on classifying the first point with the first label. Regressing the bounding box includes predicting at least a location of the bounding box. The computing system may control an autonomous vehicle based on regressing the bounding box.

16 Claims, 7 Drawing Sheets

(51) Int. Cl.
  *G05D 1/00* (2006.01)
  *G06N 3/02* (2006.01)
  *G06T 11/00* (2006.01)
  *G06T 15/00* (2011.01)
(58) Field of Classification Search
  CPC ....... G06T 11/008; G06T 15/00; G06T 17/20; G06T 7/70; G06T 2207/10028; G06T 2210/12; G06V 20/58; G06V 20/56; G06V 10/44; G06V 20/64; G06V 10/25; G06K 9/6277; G06K 9/6267; B60W 40/02; B60W 60/001; B60W 2050/0005; B60W 2050/0057
  USPC .......................................................... 382/156
  See application file for complete search history.

(56) References Cited

U.S. PATENT DOCUMENTS

| | | | |
|---|---|---|---|
| 11,282,291 B1* | 3/2022 | Boardman | G06T 1/0007 |
| 11,334,762 B1* | 5/2022 | Wrenninge | G06K 9/6256 |
| 2017/0220876 A1* | 8/2017 | Gao | G06V 20/58 |
| 2018/0348346 A1 | 12/2018 | Gonzalez et al. | |
| 2018/0376305 A1* | 12/2018 | Ramalho de Oliveira | H04W 4/44 |
| 2019/0147245 A1* | 5/2019 | Qi | G06V 10/82 382/103 |
| 2019/0174276 A1* | 6/2019 | Mineiro Ramos de Azevedo | H04W 4/38 |
| 2019/0261161 A1* | 8/2019 | Cardoso | H04W 4/38 |
| 2019/0310651 A1* | 10/2019 | Vallespi-Gonzalez | B60W 60/0015 |
| 2020/0159225 A1* | 5/2020 | Zeng | G05D 1/0088 |
| 2021/0142160 A1* | 5/2021 | Mohseni | G06N 3/0454 |
| 2022/0032970 A1* | 2/2022 | Vadivelu | G06T 1/0007 |

FOREIGN PATENT DOCUMENTS

| | | | | |
|---|---|---|---|---|
| EP | 3525131 A1 * | 8/2019 | | G06K 9/00791 |
| WO | 2018/170472 A1 | 9/2018 | | |
| WO | WO-2019178548 A1 * | 9/2019 | | G05D 1/0088 |

OTHER PUBLICATIONS

Kuang, Ping et al., "3D Bounding Box Generative Adversarial Nets," In Proceedings of the International Conference on Advances in Computer Technology, Information Science and Communications (CTISC 2019), pp. 117-121.

Chen, Qi et al., "Object as Hotspots: An Anchor-Free 3D Object Detection Approach via Firing of Hotspots," Dec. 30, 2019, arXiv:1912.12791v1 [cs.CV], 15 pages.

Wang, Bei et al., "Voxel-FPN: multi-scale voxel feature aggregation in 3D object detection from point clouds," Jan. 1, 2020, 12 pages.

Yang, Bin et al., "PIXOR: Real-time 3D Object Detection from Point Clouds," Mar. 2, 2019, arXiv:1902.06326 [cs.CV], 10 pages.

EPO Extended European Search Report dated Apr. 19, 2021, issued in corresponding European Patent Application No. 20207776.4 (7 pages).

* cited by examiner

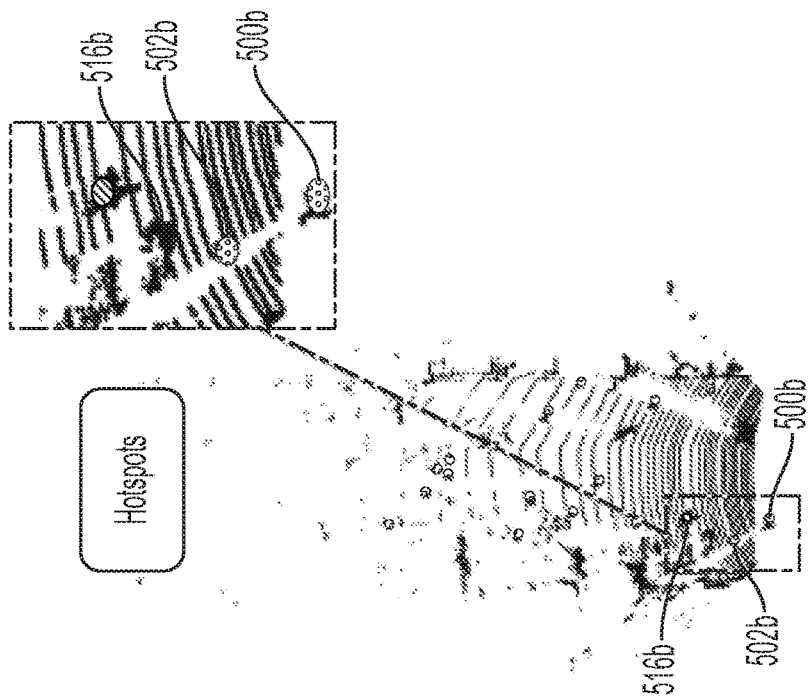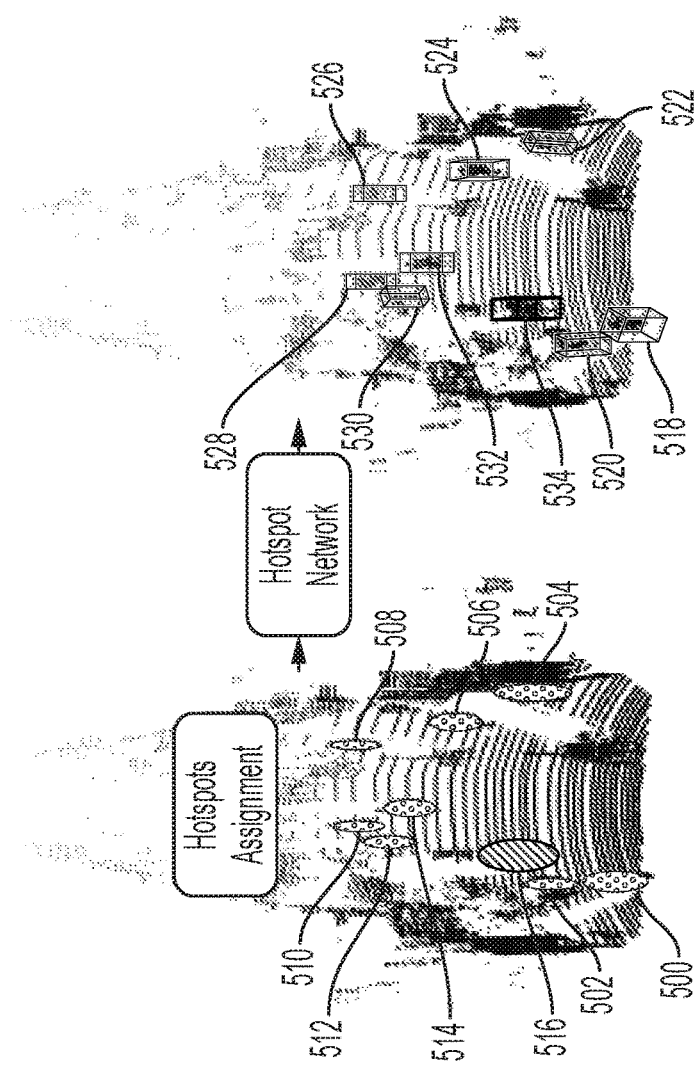
FIG. 5C
FIG. 5B
FIG. 5A

SYSTEM AND METHOD FOR THREE-DIMENSIONAL OBJECT DETECTION

CROSS-REFERENCE TO RELATED APPLICATION(S)

The present application claims priority to and the benefit of U.S. Provisional Application No. 62/939,548, filed Nov. 22, 2019, entitled "SYSTEM AND METHOD FOR ANCHOR FREE 3D OBJECT DETECTION APPROACH VIA FIRING OF HOTSPOTS," and claims priority to and the benefit of U.S. Provisional Application No. 63/050,654, filed Jul. 10, 2020, entitled "OBJECT AS HOTSPOTS: AN ANCHOR-FREE 3D OBJECT DETECTION APPROACH VIA FIRING OF HOTSPOTS, the content of both of which are incorporated herein by reference.

FIELD

One or more aspects of embodiments according to the present disclosure relate to three-dimensional (3D) object detection, and more particularly to detecting 3D objects represented via point cloud data.

BACKGROUND

In an autonomous vehicle system, a perception module may, like a human eye, sense objects in an environment to move about such an environment safely. An element of perception is 3D object detection. 3D object detection may provide location, dimension, and moving direction of objects in an environment. Such 3D detection information may be provided via geographic point clouds collected using LiDAR (Light Detection and Ranging) laser scanners/sensors. Accurate 3D object detection in LiDAR based point clouds, however, may suffer from challenges such as, data sparsity and irregularities in the point cloud data. For example, because point clouds lie on the surface of objects, self-occlusion, reflection, or undesirable weather conditions, may limit the number of points captured by the LiDAR scanner.

Accordingly, what is desired is a system and method for detecting 3D objects using LiDAR based point clouds even when such point cloud data is sparse.

SUMMARY

An embodiment of the present disclosure is directed to a method for three-dimensional (3D) object classification. The method includes receiving, by a computing system, point cloud data from an input source. The point cloud data may include first and second points in 3D space. The first point may represent a feature of an object. The computing system invokes a neural network for classifying the first point with a first label, and regresses a bounding box based on classifying the first point with the first label. Regressing the bounding box includes predicting at least a location of the bounding box. The computing system may control an autonomous vehicle based on regressing the bounding box.

According to one embodiment, the method for 3D object classification further includes transforming the received point cloud data into a plurality of voxels. A first voxel of the plurality of voxels may include the first point, and a second voxel of the plurality of voxels may include no points.

According to one embodiment, the classifying of the first point includes classifying the first voxel with the first label. The second voxel may be classified with a second label different from the first label. The regressing of the bounding box may be based on the first voxel.

According to one embodiment, the classifying of the first point includes classifying the first voxel with the first label. The second voxel may be classified with the first label, and the regressing of the bounding box may be based on the first voxel and the second voxel.

According to one embodiment, the method for 3D object classification further includes training the neural network based on training data. The training data may include a particular point associated with the object. The particular point may be assigned the first label in response to detecting that the particular point is within a threshold distance to a center of the object.

According to one embodiment, M number of points in the training data are assigned the first label, where M is determined based on a volume of the object.

According to one embodiment, the method for 3D object classification further includes training the neural network based on training data, where the training includes learning relative spatial information of two points assigned the first label.

According to one embodiment, the learning of the relative spatial information includes dividing a ground truth bounding box associated with the object into partitions; and classifying a particular point associated with the object and assigned the first label, to one of the partitions.

According to one embodiment, the method for 3D object classification further includes computing a partition classification loss, and training the neural network based on the partition classification loss.

According to one embodiment, the training of the neural network is further based on a classification loss computed from classifying points with the first label, and a regression loss computed from bounding box regression of the classified points.

According to one embodiment, the regressing of the bounding box includes applying soft argmin for regressing location parameters associated with the first point.

An embodiment of the present disclosure is further directed to a system for three-dimensional (3D) object classification. The system may comprise a processor and a memory, where the memory may store instructions that, when executed by the processor, cause the processor to: receive point cloud data from an input source, wherein the point cloud data includes first and second points in 3D space, wherein the first point represents a feature of an object; invoke a neural network for classifying the first point with a first label; regress a bounding box based on classifying the first point with the first label, wherein the regressing of the bounding box is for predicting least location of the bounding box; and control an autonomous vehicle based on regressing the bounding box.

As a person of skill in the art should recognize, embodiments of the present disclosure provide a mechanism for efficiently recognizing 3D objects using point cloud data, even when such point clouds may be sparse. These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIGS. 5A-5C are conceptual layout diagrams of 3D object detection using hotspots according to one embodiment;

DETAILED DESCRIPTION

Figure 1:
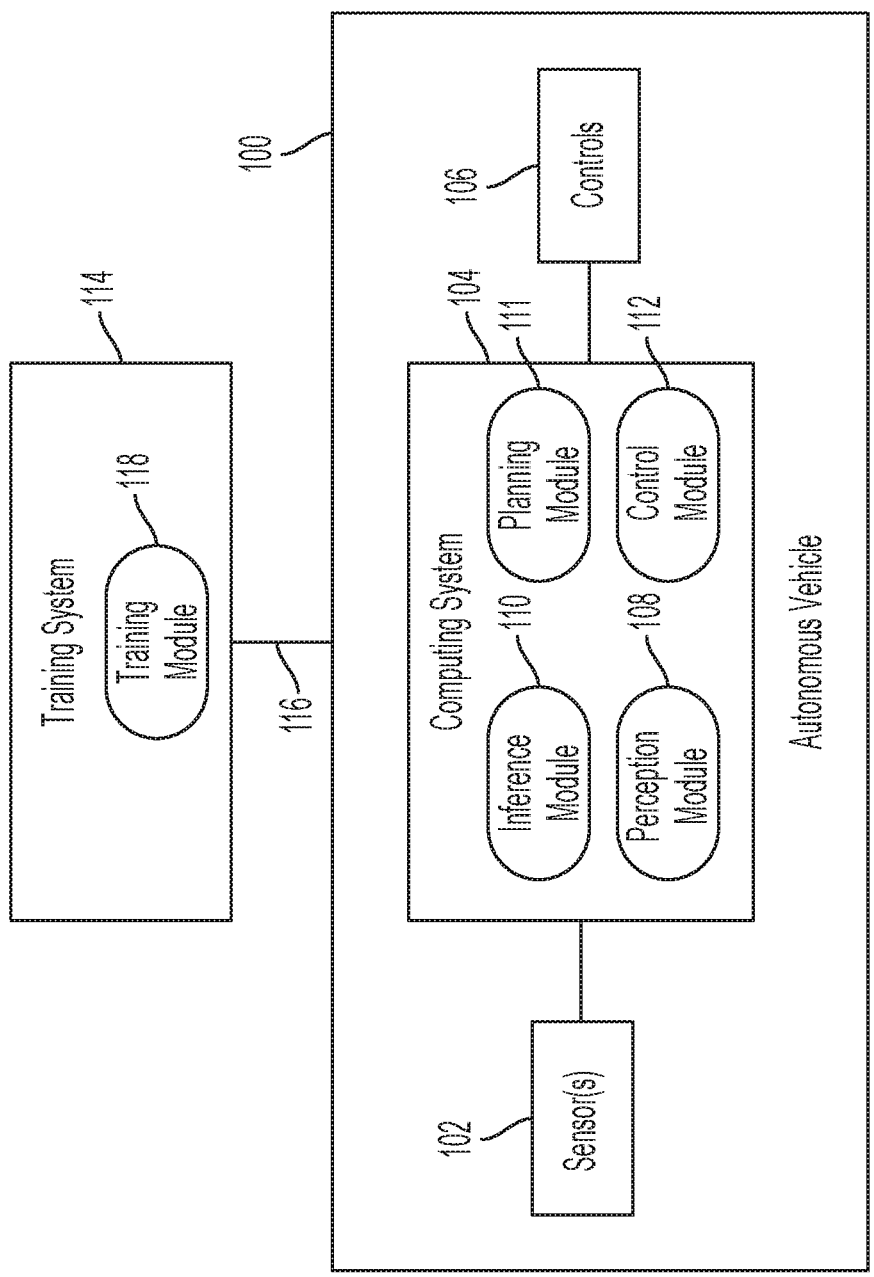
FIG. 1 is a block diagram of a system for controlling navigation of an autonomous vehicle according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

In general terms, embodiments of the present disclosure are directed to a system and method for 3D object detection using geographic point clouds, such as, for example, geographic point clouds generated by LiDAR laser scanners. The various embodiments are not limited to point clouds generated by LiDAR laser scanners, but may encompass other point clouds such as, for example, point clouds generated by stereo camera, point clouds collected using Azure Kinect, and the like.

Accurate 3D object detection in LiDAR based point clouds may suffer challenges due to, for example, data sparsity and irregularities in the data. To help alleviate these challenges, related-art methods may organize points on individual objects together, and define object-level anchors (e.g. bounding boxes with box location and size), that predict offsets of 3D bounding boxes using collective evidence from all the points on the objects of interest. For example, a related-art system may include a voxel feature encoder that aggregates sampled point features in a voxel, and extracts voxel features using a 2D/3D neural network. A voxel-based approach may utilize hyperparameters, such as anchor ranges, anchor sizes, and orientations, to define the object-level anchors, as well as an Intersection over Union (IOU) threshold to assign ground truths. Use of predefined anchors, however, may involve prior knowledge about the statistical size and orientation of objects.

In one embodiment, 3D object detection from point cloud data is performed anchor-free, without the need for predefined object-level anchors. Instead of using object-level anchors, an embodiment of the present disclosure represents an object as a composition of its interior points or voxels (e.g. non-empty voxels containing points), referred to as hotspots, along with spatial relations of the hotspots. A non-empty voxel may be referred to as a spot. In one embodiment, among the spots that represent an object, a limited number of the spots that carry discriminative features of the object are selected and assigned as hotspots. For example, points close to a windshield may contain discriminative features for representing a car.

In one embodiment, features of individual points inside each voxel may be aggregated to form a particular hotspot representation. A hotspot with information on a limited feature of an object may thus be responsible for information of the entire object. In this manner, even when a small object is represented via a small number of points, or even if an otherwise larger object is mostly occluded or partially scanned, presence of the object may still be detected upon detecting a hotspot associated with a discriminative feature of the object. The object's semantic information (e.g. object category to which the object belongs), and localization (e.g. location of the object for purposes of placing a bounding box), may then be obtained via the detected hotspot. The representation of an object via hotspots and their spatial relation information, may be referred to Object as Hotspots (OHS).

In one embodiment, the anchor-free detection of 3D objects is performed by a system that includes an anchor-free detection head (OHS head). The OHS head may include one or more neural networks configured to make predictions about objects from a limited number of individual hotspots, without the need of predefined bounding boxes. The OHS head may then predict bounding boxes based on the detected hotspots.

In one embodiment, the OHS head employs a ground truth assignment strategy in selecting and assigning hotspots, that deals with inter-object point-sparsity imbalance issues that may be caused by different object sizes, different distances of the objects to the LiDAR sensor, different occlusion/truncation/reflection levels, and/or the like. The ground truth assignment strategy according to one embodiment may be configured to prevent the network from biasing towards objects with more points. As an example, a high number of points may be captured on large objects that are close to the LiDAR sensor source, while fewer points may be collected for smaller and/or occluded objects. A feature imbalance may thus occur when objects with more points have rich and redundant features for predicting semantic classes and localization, while objects with fewer points may have fewer features to learn from. In one embodiment, the OHS head is configured to learn from limited features from an object that are deemed to be, for example most discriminative, to help prevent bias towards objects with more points.

During an inference stage, the OHS head may be configured to make predictions about an object's semantic information and localization by making predictions on individual hotspots. In this regard, a hotspot may be activated, without setting predefined bounding boxes, if it gives threshold confidence of being part of an object. A 3D bounding box may then be regressed for the activated hotspots.

Performing bounding box regression using an anchor-free detector that does not benefit from human-defined prior anchor sizes, may be challenging. One such challenge may be due to regression target imbalance that may be caused due to scale variance of the bounding boxes. More specifically, bounding box centers and sizes may appear in different scales as some objects marked by the bounding boxes may have relatively large sizes, while others may not. The scale variances in target values for the bounding boxes may give rise to scale variances in gradients. Small values may tend to have smaller gradients and have less impact during training.

In some systems, anchor-based detectors may rely on anchor locations and sizes to serve as normalization factors to help ensure that regression targets are mostly small values (e.g. around zero). Multiple sizes and aspect ratios may be hand-designed to capture the multi-modal distribution of bounding box sizes. In this regard, anchor-free detectors may be regarded as anchor-based detectors with one anchor of unit size at each location. Thus, anchor-free detectors may not enjoy the normalizing effect of different anchor sizes. In one embodiment, regression target imbalance is addressed via application of soft argmin from stereo vision principles. In this regard, the OHS head may employ soft argmin to regress location of the bounding box, and address the bounding box regression challenge. In one embodiment, regression target imbalance may also be addressed by regressing logarithmic values for the bounding box dimension instead of the absolute values.

FIG. 1 is a block diagram of a system for controlling navigation of an autonomous vehicle 100 according to one embodiment. The autonomous vehicle 100 may be a land vehicle (e.g. a car), an air vehicle (e.g. an airplane), or the like (e.g. water vehicle). Embodiments of the present disclosure may also be applied in contexts other than controlling navigation of an autonomous vehicle. For example, embodiments of the present disclosure may extend to augmented reality applications, driver/pilot assistance applications, mapping applications, and/or other applications where 3D object detection may be desired.

The autonomous vehicle 100 may include one or more sensors 102, a computing system 104, and one or more vehicle controls 106. The one or more sensors 102 may include one or more LiDAR sensors configured to provide a 3D location of a number of points that correspond to objects that have reflected a ranging laser. The collection of points may form a point cloud representing a 3D shapes of the objects. The one or more sensors 102 may be located, for example, on the roof of the autonomous vehicle.

The computing system 104 may include one or more processors and a memory.

The memory may store instructions that, when executed by the one or more processors, cause the one or more processors to execute the various operations described herein. In one embodiment, the instructions cause the one or more processors to receive the point cloud data from the sensors 102, process the data for understanding the surrounding environment, and control the autonomous vehicle based on the understanding of the environment.

In one embodiment, the vehicle computing system 104 includes, without limitation, a perception module 108, inference module 110, motion planning module 111, and control module 112. Although the various modules 108-112 are assumed to be separate functional units, a person of skill in the art will recognize that the functionality of the modules may be combined or integrated into a single module, or further subdivided into further sub-modules without departing from the spirit and scope of the inventive concept.

In one embodiment, the perception module 108 receives from the one or more sensors 102, information on the location of points that correspond to objects in the environment surrounding the autonomous vehicle 100, and determines a state of objects that are proximate to the vehicle. The state information may include, for example, the object's location/position, speed, heading, orientation, yaw rate, and/or the like.

The inference module 110 may include one or more neural networks making up the OHS head, such as, for example, one or more convolutional neural networks. The one or more neural networks of the OHS head may be trained to detect one or more classes of objects in the point cloud data that is provided by the sensor 102, and generate output data for the detected objects. The output data may be, for example, a predicted object classification label (e.g. vehicle, bicycle, pedestrian, etc.), and location, direction, and/or bounding box information associated with a detected object. It should be noted that although a convolutional neural network (CNN) is used as an example, other types of neural networks may be employed in lieu or in addition to CNNs, such as, for example, recurrent neural networks (RNNs), long short-term memory (LSTM) recurrent neural networks, feed-forward neural networks, and/or the like. The neural network that is employed may include different number of layers and different number of nodes within each layer of the neural network According to one embodiment, the inference module 110 performs a one-stage, anchor-free detection of 3D objects via the OHS head. In this regard, the OHS head may be configured to process input data once to predict 3D bounding boxes by making prediction of object hotspots, without the need of predefined location and size of anchors/bounding boxes as ground truth. It should be noted that although a bounding box is used as an example of an annotation used for marking a detected object, embodiments of the present disclosure are not limited to boxes, and any two- or three-dimensional bounding polygon may be used.

In one embodiment, the inference module 110 invokes the OHS head for extracting a feature map from input point cloud data, and classifying a neuron of the feature map as corresponding to a hotspot for an object of interest. In one embodiment, the OHS head is configured to make predictions about an object's semantic information (e.g. object's classification) and localization (e.g. object's bounding box), by making predictions on individual hotspots. The predictions from the individual hotspots may be aggregated for generating final object detection results.

In one embodiment, the OHS head is configured to regress a 3D bounding box for an identified object's hotspot, for marking the object in the 3D point cloud space. In one embodiment, the OHS head regresses a center location, dimension, and orientation of the 3D bounding box. In order to address a regression target imbalance issue, the regression may be performed by soft argmin instead of raw values. In this regard, experiments show that particularly for objects of small sizes (e.g. cyclists and pedestrians), soft argmin improves the performance by avoiding regression on absolute values of different scales. In one embodiment, regression target imbalance may also be addressed by regressing logarithmic values for the bounding box dimension instead of the absolute values.

In one embodiment, information on objects detected by the inference module 110 are provided to the motion planning module 111. In one embodiment, the motion planning module 111 may be configured to determine a motion plan for the autonomous vehicle 100, based on the predictions of future locations and/or moving paths of objects detected by the inference module 110. In this regard, the motion planning module 111 may generate a motion plan that avoids collision with an object, approaches an object, or a combination thereof. Whether the motion planning module 111 causes the motion plan to avoid or approach a particular object may be based on object classification information generated by the inference module 110. For example, the motion planning module 111 may generate a motion plan that avoids an object classified as a bicycle and that approaches a fuel pump. A motion plan that approaches an object may also avoid collision with the object. For example, a motion plan may approach but not intersect with a fuel pump.

In one embodiment, the control module 112 generates commands to the vehicle controls 106 to control the autonomous vehicle 100 according to the motion plan by the motion planning module 111. The one or more vehicle controls 106 may include, without limitation, actuators or other devices which control gas flow, acceleration, steering, braking, and/or the like. Based on commands from the control module 112, the vehicle controls 106 may cause the autonomous vehicle 100 to move, stop, or take another desired action.

In one embodiment, the computing system 104 is coupled to a training system 114 over a data communications network 116. The data communications network may be a local area network, private wide area network (WAN), and/or public wide area network such as, for example, the Internet. In some embodiments, the communications network may include a wireless carrier network including a code division multiple access (CDMA) network, global system for mobile communications (GSM) network, or any wireless network/technology conventional in the art, including but to limited to 3G, 4G, 5G, LTE, and the like.

The training system 114 may include one or more processors and memory. The memory may store instructions that, when executed by the one or more processors, cause the one or more processors to train the OHS head for 3D object detection. In this regard, the training system 114 may include a training module 118 for training the OHS head using one or more training or learning algorithms. One example training technique is backwards propagation of errors. In some embodiments, the training module 118 is configured for supervised training based on labeled training data.

In one embodiment, the training module 118 employs supervised learning techniques to train the OHS head using training data. The training data may include, for example, ground truth data. Ground truth data may be a representation of point cloud data (e.g. recorded by the sensors 102 of the autonomous vehicle 100), and one or more labels/annotations associated with objects within the point cloud data, where the objects are represented by bounding boxes. The one or more labels may provide, without limitation, object classification information (e.g. car, pedestrian, bicycle, traffic light, etc.), and location/position, direction, speed, and acceleration information. In one embodiment, the ground truth data identifies the neurons on a feature map that represent features of an object, as hotspots or non-hotspots, and partition information/spatial relation information of the hotspots. A neuron of a feature map may represent a collection of voxels. A non-empty voxel (referred to as a spot) may contain one or more points. According to one embodiment, only a subset of spots that are associated with one or more discriminative features of an object are assigned as hotspots. In this manner, prediction may be achieved even for sparse point clouds that contain points that are hotspots.

In one embodiment, the training of the OHS head includes providing a portion of the ground truth data (e.g. representation of the point cloud data) to the OHS head in order to make predictions on detected objects. For example, the OHS head may output predictions on the classification of a detected object in the point cloud data, and associated location/position, direction, and/or bounding box information. The prediction results may be used by the training module 118 to apply or compute a loss function that compares the predictions to the ground truth data that the neural network attempted to predict. The training module 118 may be configured to backpropagate the loss function through the OHS head, to train the OHS head by modifying, for example, one or more weights associated with the neural networks making up the OHS head.

The process of inputting ground truth data, determining a loss function, and backpropagating the loss function, may be repeated numerous times with different training data until convergence is achieved, at which point the OHS head may be deemed to be trained.

As a person of skill in the art will appreciate, it may be costly to localize points during training. In one embodiment, spatial relation encoding is used to learn the relative spatial information between hotspots to obtain 3D information accurately and efficiently. In this regard, the training module 118 includes a spatial relation encoder that divides an object (or its corresponding bounding box) into partitions (e.g. quadrants). In one embodiment, predictions are made as to the partition in which the hotspots may be located. The smaller area associated with the predicted partition may thus be searched for localizing the hotspots, instead of searching a larger area. In this manner, spatial relation encoding may help expedite convergence of the OHS head.

Figure 2:
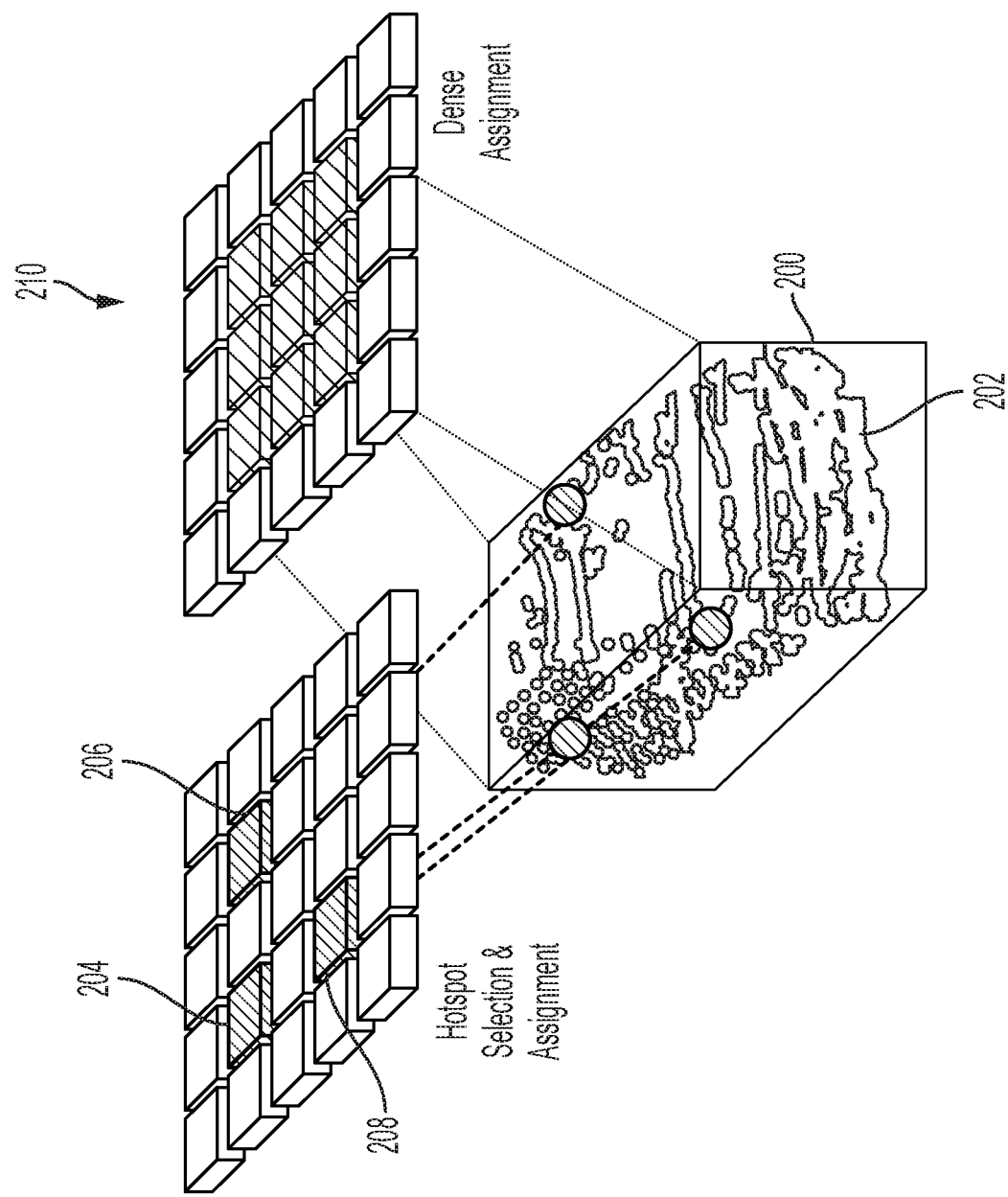
FIG. 2 is a layout diagram of hotspot selection and assignment by a training module according to various embodiments.

FIG. 2 is a layout diagram of hotspot selection and assignment by the training module 118 according to various embodiments. In the example of FIG. 2, a ground truth (annotated) bounding box (b) 200 contains point clouds 202 from a particular object (e.g. car). Annotations may define the bounding box (b) 200 as follows: b=[k, x, y, z, l, w, h, r], for indicating the object location, where k is an object category index, (x, y, z) is a center of the box, (l, w, h) is a dimension of the box, and r is a rotation angle around the z-axis in radius, in LiDAR coordinates.

In some situations, due to labeling errors, boundary points could lie in a confusing area between an object and the background, and may not contribute to the final regression. In one embodiment, an effective box is defined as [x, y, z $\epsilon_e \cdot l, \epsilon_e \cdot \omega, \epsilon_e \cdot h$, r] so that points within the effective box may all be deemed to be high-confident hotspots. In one embodiment, an ignoring box [x, y, z, $\epsilon_i \cdot l, \epsilon_i \cdot \omega, \epsilon_i \cdot h$, r] outside the effective box may be defined to be a soft boundary between object and background. In one embodiment, $\epsilon_e$ and $\epsilon_i$ is a ratio to control the effective region and ignoring region, where $\epsilon_i \geq \epsilon_e$. In one embodiment, points outside the effective box but inside the ignoring box may not be used for doing backpropagation during training. Points outside the ignoring box may be deemed to be non-hotspots.

According to one embodiment, spots that are selected as hotspots are aimed to satisfy three properties: 1) they compose distinguishable parts of the objects in order to capture discriminative features; 2) they may be shared among objects of the same category so that common features can be learned from the same category; and 3) they are limited in number so as to allow detection of objects with small number of points (or points that are occluded), but contain sufficient information to predict semantic information and localization. In this regard, hotspots may be selected and assigned, during training, using a direct methodology or a dense methodology. In the direct methodology, voxels 204, 206, 208 that contain points (spots) associated with the object 202 that are within a threshold distance from a center of the object may be identified. A preset number of the identified voxels may be selected and projected to corresponding locations of neurons on an output feature map of a backbone network. The corresponding neurons may then be designated as hotspots, and assigned positive labels. In one embodiment, M nearest spots to the center of the object are selected as hotspots, where M may vary based on the volume of the object. Embodiments of the present disclosure may extend to other methodologies for selecting hotspots, and are not limited to the methodology disclosed herein.

In the dense methodology, all voxels 210 associated with the bounding box 200, including empty voxels that do not contain any points, are projected to corresponding locations of neurons on the feature map, and the corresponding neurons are designated as hotspots. Voxels around the bounding box boundaries may be ignored.

More specifically with respect to the direct methodology that selects a subset of non-empty voxels (spots) on objects as hotspots, a voxel corresponding to a neuron in the output feature map may be denoted as $V_n$, where n indexes a neuron. In one embodiment, the annotations do not tell which parts are distinguishable, but they may be inferred from the ground truth bounding boxes $B_{gt}$ (e.g. bounding box 200). It may be assumed that $V_n$ is an interior voxel of the object if inside $B_{gt}$. Furthermore, $V_n$ may be considered as a spot if it is both non-empty and inside $B_{gt}$. In one embodiment, spots nearest to the object center are chosen as hotspots based on two motivations: 1) points closer to the object center may have more chances to appear in most objects while points to the side are may be likely to disappear if the viewing angle changes; 2) locations closer to object centers tend to provide more accurate localization.

In one embodiment, at most M nearest spots are selected as hotspots in each object, where M is an adaptive number. In one embodiment, M=C/Vol, where C is a hyperparameter that may be adjusted by a user, and Vol is the volume of the bonding box. Because objects of larger volumes tend to have more points and rich features, an embodiment of the present disclosure uses an adaptive M to further suppress the number of hotspots in larger objects. In one embodiment, if the number of spots in an object is less than M, all spots are assigned as hotspots.

Figure 3:
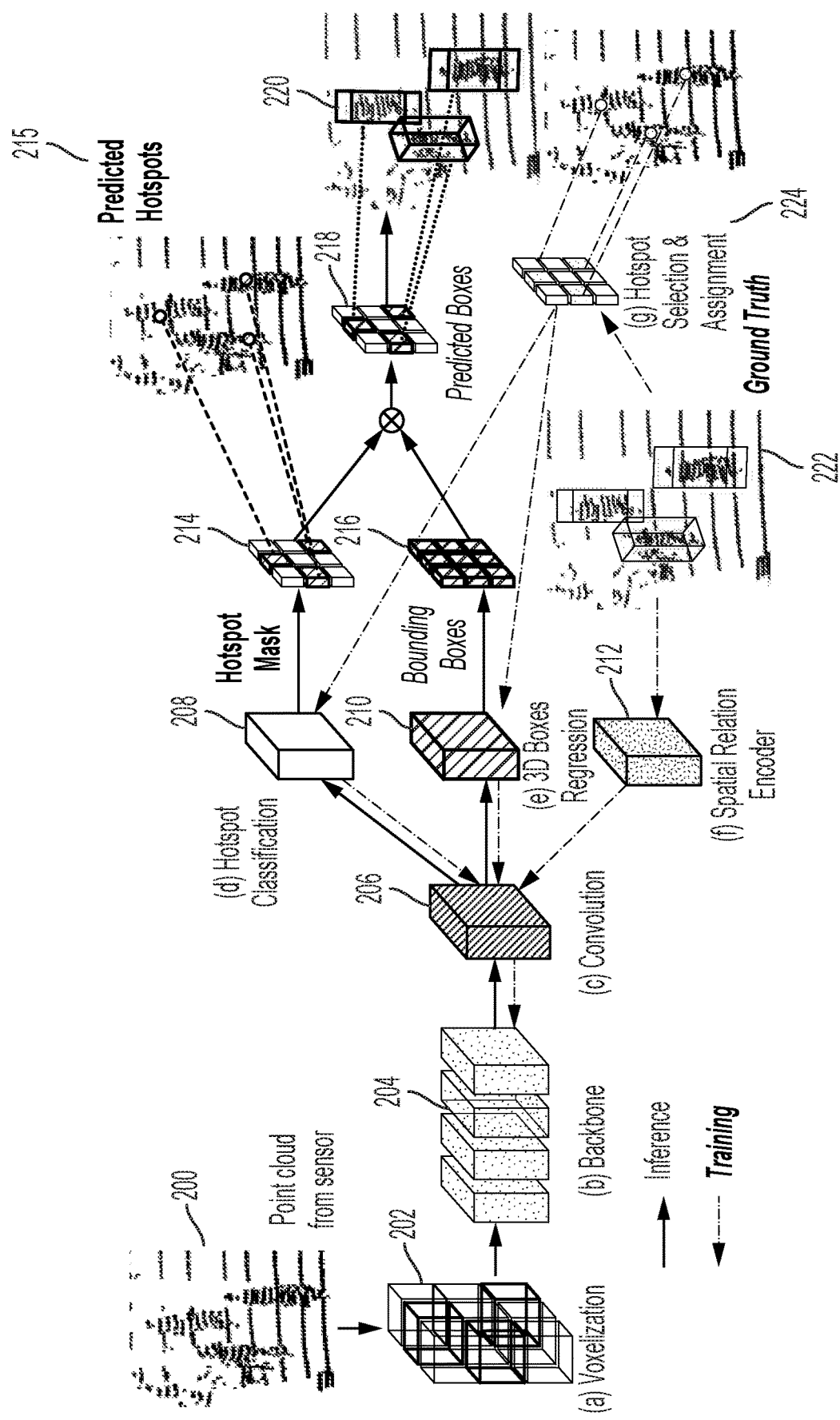
FIG. 3 is conceptual layout diagram of a process for training an Object-as-Hotspot head for a one-stage, anchor-free 3D object detection according to one embodiment.

FIG. 3 is conceptual layout diagram of a process for training the OHS head for a one-stage, anchor-free 3D object detection according to one embodiment. In one embodiment, point cloud data 200 from the one or more sensors 102 is transformed/voxelized into a grid of cells (e.g. cuboid shaped voxels 202), and passed to a backbone network 204. A particular cell/voxel may contain zero or more points of the point cloud data. In some embodiments, the step of voxelizing the point clouds may be by-passed, and raw point cloud data used for performing object detection without voxelizing the points.

The backbone network 204 may be, for example, a 3D convolutional neural network, hosted by the inference module 110. One or more layers of the backbone network 204 may be invoked to extract various features of the point cloud data. One or more output feature maps with one or more neurons that may be mapped to the extracted features may be output by the backbone network 204. In one embodiment, the output feature maps collapse to a bird's eye view (BEV). In one embodiment, location of one or more voxels are projected to a corresponding location of a neuron of a particular output feature map.

In one embodiment, the one or more output feature maps are provided to a shared convolutional network 206 that provide one or more convolutional layers for hotspot classification, 3D box regression, and spatial relation encoding. In this regard, the shared convolutional network 206 may include a hotspot classification subnet 208 for hotspot classification, box regression subnet 210 for 3D box regression, and spatial relation encoder subject 212 for spatial relation encoding. The shared convolutional network 206, along with the various subnets 208-212, may be referred to as the OHS head. The OHS head may guide supervision and generate predicted 3D bounding boxes. In one embodiment, the OHS head may be hosted by the inference module 110 and/or training module 118.

In one embodiment, the hotspot classification subnet 208 predicts the likelihood of object class categories for the neurons of the output feature map. In one example, the hotspot classification subnet 208 is a binary classifier that classifies a neuron of the output feature map as a hotspot or not, for a particular class of objects. According to one embodiment, the classification subnet 208 may take the form of a convolutional layer with K heatmaps, where a particular heatmap corresponds to a particular category/class of objects (e.g. cars, pedestrians, bicycles, traffic lights, etc.). The hotspots for a particular class of objects may be labeled as "1," whereas targets for the non-hotspots may be labeled as "0."

In one embodiment, the hotspot classification subnet 208 applies a gradient mask 214 so that gradients for non-hotspots inside the ground truth bounding boxes are set to zero. This may allow non-hotspots to be ignored during training and may not contribute to backpropagation. The gradient mask 214 may output predicted hotspots 215 with a threshold level of confidence. In one embodiment, a neuron on a feature map is identified as a hotspot if the hotspot prediction satisfies (e.g. is above or equal to) the threshold confidence.

In one embodiment, the hotspot classification subnet 208 performs a binary classification for hotspots and non-hotspots. A classification loss function, such as, for example, a focal loss function may be applied at the end of the classification so that, $$\mathcal{L}_{cls} = \sum_{k=1}^{K} \alpha(1-p_k)^{\gamma} \log(p_k)$$

$$\text{where, } p_k = \begin{cases} p, & \text{hotspots} \\ (1-p), & \text{non-hotspots} \end{cases}$$

where, $\rho$ is the output probability, and K is the number of object categories.

In one embodiment, the total classification loss may be averaged over the total number of hotspots and non-hotspots (excluding non-hotspots in ground truth bounding boxes).

The box regression subnet 210 may be configured to engage in bounding box regression 216 for predicting 3D bounding boxes 218 based on the predicted hotspots 215. In one embodiment, the box regression subnet 210 regresses the location, dimension, and direction of the neurons of the output feature map corresponding to the predicted hotspots.

The regressed data may be used to generate bounding boxes 220 to mark the detected objects in the 3D point cloud 200 space.

In one embodiment, bounding box regression is performed on only hotspots. In this regard, for a particular hotspot, an eight-dimensional vector [$d_x$, $d_y$, z, log(l), log (w), log(h), cos(r), sin(r)] with parameters associated with location, dimension, and direction, is regressed to represent a detected object in the point cloud 200 space. Parameters $d_x$, $d_y$ may be axis-aligned deviations of the hotspot on the feature map to the object centroid. The hotspot voxel centroid in the input point cloud space 200 in BEV may be obtained by:

$$[x_h, y_h] = \left(\frac{j+0.5}{L}(x_{max} - x_{min}) + x_{min}, \frac{i+0.5}{W}(y_{max} - y_{min}) + y_{min}\right),$$

where i, j are the spatial index of its corresponding neuron on the feature map with size W× L, and [$x_{min}$, $x_{max}$], [$y_{min}$, $y_{max}$] are the ranges for x, y when the points are voxelized.

As discussed above, anchor-free detectors suffer from regression target imbalance. Such regression target imbalance may be addressed by carefully designing the targets. In one embodiment, log(l), log(w), log(h) are regressed instead of their original values because a log function scales down absolute values. In addition, cos(r), sin(r) may be regressed instead of the absolute value r, because they are constrained in the range of [−1, 1], instead of the range of [−π, π] for the original angle value. Furthermore, soft argmin may be used to help regress location of the hotspot represented by $d_x$, $d_y$, and z. To regress a point location in a segment ranging from a to b by soft argmin, the segment may be divided into N bins, each bin accounting for a length of $$\frac{b-a}{N}.$$

The target location may be represented as $t=\sum_i^N (S_i C_i)$ where Si represents the softmax score of the ith bin and $C_i$ is the center location of the ith bin. Soft argmin may address regression target imbalance by turning the regression into a classification problem that avoids regressing absolute values. In one embodiment the choices of a, b do not affect the performance of the approach as long as they cover the ranges of target values.

In one embodiment, a regression loss function such as, for example, smooth L1 loss may be adopted for regressing the bounding box targets as follows:

$$\mathcal{L}_{loc}(x) = \begin{cases} 0.5x^2, & |x| < 1 \\ |x| - 0.5, & \text{otherwise} \end{cases}$$

In one embodiment, the regression loss is computed for training the network to predict locations that are associated with hotspots.

In one embodiment, the spatial relation encoder subnet 212 is invoked during training for learning the relative spatial relationship of hotspots. Ground truth data 222 that is used for the training may implicitly provide relative spatial information between hotspots. Spatial relation encoding may thus reinforce the inherent spatial relations between hotspots.

In this regard, the axis-aligned deviations (dx, dy) from hotspots to object centroids predicted by the OHS head may vary with object orientations, and thus, may not show the inherent relation between hotspots and object centroids. In one embodiment, the OHS head is trained to learn the inherent and invariant object-part relation via a supervision signal for coarse estimation of the hotspots. In this regard, one or more target objects in the context of autonomous driving may be considered as rigid objects (e.g. cars), so the relative locations of hotspots to object centers may not change, and the relative locations may be determined with the help of bounding box centers and orientations. In one embodiment, the relative hotspot location to the object center (in BEV) may be categorized into a vector representing partitions. In one embodiment, the hotspot spatial relation encoder subnet 212 is trained with binary cross-entropy loss. In one embodiment, a partition loss is computed only for hotspots as follows:

$$\mathcal{L}_q = \sum_{i=0}^{3} -[q_i \log(p_i) + (1-q_i)\log(1-p_i)]$$

where, i indexes the partition, $q_i$ is the target, and $p_i$ the predicted likelihood falling into the specific partition.

Training of the OHS head may also include selection and assignment of hotspots 224. In one embodiment, a point/voxel may be selected and assigned as a hotspot based on a determination as to its distance to the center of an object. In one embodiment, the number of hotspots that are selected to represent an object may vary depending on the volume of the object.

In one embodiment, the training module 118 is configured to compute a total loss as a weighted sum of the classification, regression, and partition losses, as follows:

$$\mathcal{L} = \delta \mathcal{L}_{cls} + \beta \mathcal{L}_{loc} + \zeta \mathcal{L}_q$$

where, δ, β and ζ are the weights to balance the classification, regression, and partition losses, respectively.

In one embodiment, the total loss may be used for training the OHS head. In this regard, the total loss may be back-propagated through the OHS head for modifying, for example, one or more weights associated with the neural networks representing the OHS head. Once trained, the OHS head may be used for generating predicted 3D bounding boxes for predicted hotspots corresponding to certain classes of objects in the input point cloud. Based on the predictions, an autonomous vehicle such as the vehicle 100 of FIG. 1, may be controlled.

During inference, a K-dimensional vector of the K classification heatmaps corresponding to the object classes may be evaluated for identifying a largest confidence value of the vector. In one embodiment, if the identified value for a particular object class satisfies (e.g. is above or equal to) a threshold, the corresponding location may be deemed to be a hotspot for the associated object instance. A predicted bounding box may be regressed for the identified hotspot based on b=[dx, dy, z, l, w, h, cos(r), sin(r)], which may be mapped to the canonical representation [x, y, z, l, w, h, r] and projected to the original point cloud space. In one embodiment, labels of objects associated with the identified hotspots may be obtained and output in association with the projected bounding boxes.

It may be possible that an object instance may have multiple predicted hotspots that are above a given threshold. In one embodiment, such a situation may be addressed via non-maximum suppression (NMS) with an Intersection Over Unit (IOU) threshold for picking a most confident hotspot for the object. The IOU threshold may provide a threshold ratio of an overlapping area of ground truth hotspots to predicted hotspots. A most confident hotspot that satisfies the IOU threshold may be selected for a particular object.

Figure 4:
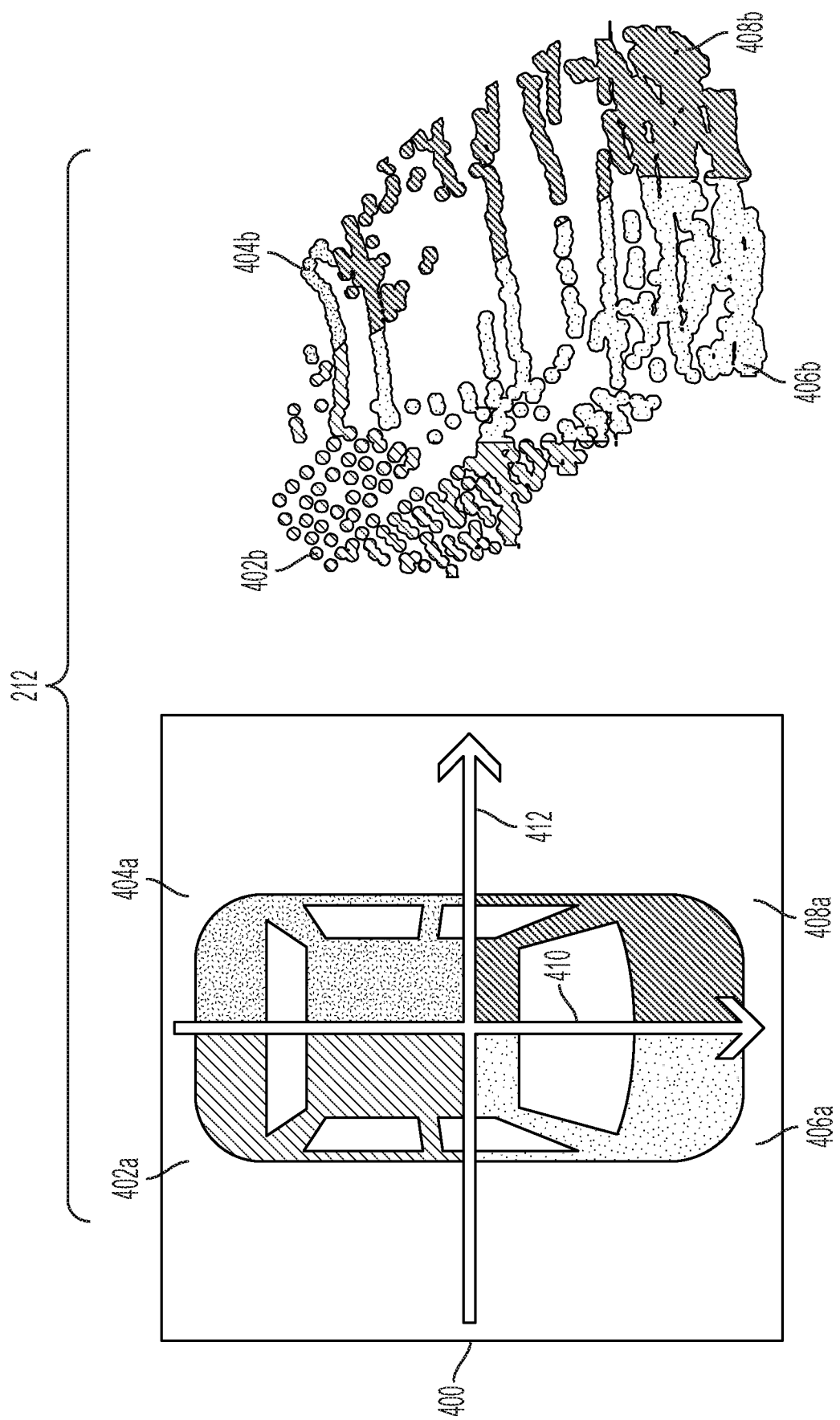
FIG. 4 is a conceptual layout diagram of a spatial relation encoder subnet dividing a bounding box into quadrants according to one embodiment.

FIG. 4 is a conceptual layout diagram of the spatial relation encoder subnet 212 dividing a bounding box 400 into four partitions (quadrants 402a-408a) according to one embodiment. The quadrants may be divided, in bird eye view, based on orientation 410 of the object (e.g. front-facing direction) and its perpendicular direction 412. In one embodiment, the quadrants are fixed with respect to the object's orientation 410. The quadrants may be identified, for example, via numbers (0, 1, 2, 3), colors (green, blue, purple, orange), or the like. In one embodiment, points (e.g. hotspots) representing the objects are classified into their respective quadrants 402b-408b.

FIGS. 5A-5C are conceptual layout diagrams of 3D object detection using hotspots according to one embodiment. Hotspots 500-516 are selected for objects that belong in one or more object categories (e.g. cars, pedestrians, bicycles, traffic lights, etc.). For example, in the example of FIG. 5A, hotspots 500-514 are assigned for objects labeled as pedestrians, and a hotspot 516 is assigned to an object labeled as a bicycle. Based on the assignment of the hotspots, 3D bounding boxes labeled as a pedestrian 518-532, or bicycle 534 may be regressed for hotspots detected by the OHS head. FIG. 5C identifies example hotspots that may be fired/actuated for assigned hotspots 500, 502, and 516. The fired hotspots 500b, 502b, and 516b may be used for inferring 3D information for the associated object instance.

Figure 6:
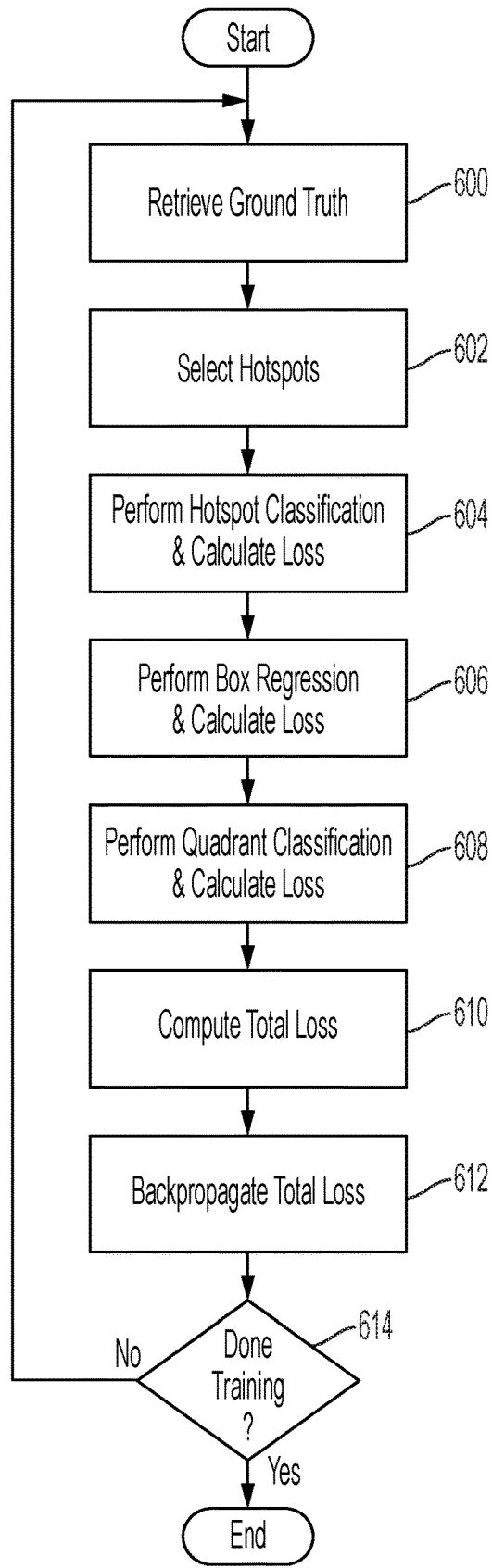
FIG. 6 is a flow diagram of a process for training Object-as-Hotspot head according to one embodiment.

FIG. 6 is a flow diagram of a process for training the OHS head according to one embodiment. The process starts, and in block 600, the training module 118 may retrieve, from a data storage device, training data including ground truth data of one or more object instances in a point cloud. The ground truth data for a particular object instance may include, for example, bounding box information for the object instance. The bounding box information may include, without limitation, an object category to which the object instance belongs, and location, dimension, and direction of the bounding box.

In block 602, one or more of the points/voxels in a particular bounding box are assigned as hotspots. In one embodiment, a collection of non-empty voxels within the bounding box are projected to a corresponding location of a neuron of a corresponding feature map, and the neuron is given a positive label of a hotspot. In some embodiments, instead of only selecting non-empty voxels, both empty and non-empty voxels of the bounding box are selected for being designated as hotspots.

In block 604, after proper feature extraction, the hotspot classification subnet 208 may be invoked for classifying one or more neurons of the output feature map, as a hotspot. In this regard, neurons predicted to be hotspots may be labeled as "1," while neurons that are not predicted to be hotspots may be labeled as "0." In one embodiment, a confidence value for the predictions are generated, and neurons that are predicted to be hotspots that satisfy a threshold confidence level are classified as hotspots. A classification loss may then be computed, where the total classification loss may be averaged over a total number of hotspots and non-hotspots (excluding non-hotspots in ground truth bounding boxes).

In block 606, the box regression subnet 210 may be invoked for regressing bounding boxes for the classified hotspots. In this regard, an 8-dimensional vector [$d_x$, $d_y$, z, log(l), log(w), log(h), cos(r), sin(r)] may be regressed to represent the object instance in the point cloud. In this regard, given that the 3D object detection according to the various embodiment is anchor-free, soft argmin may be employed to regress the $d_x$, $d_y$, and z coordinates of the bounding box. Experiments show that using soft argmin instead of raw values improves performance by turning regression into a classification problem that avoids regression on absolute values of different scales, helping address regression target imbalance. In one embodiment, a regression loss is computed for regressing the bounding box targets.

In block 608, the spatial relation encoder subnet 212 is invoked for learning the relative spatial relationship between hotspots. In this regard, the spatial relation encoder subnet 212 may be configured to categorize the identified hotspots into a vector defined by a set number of parameters representing a set number of partitions. In one embodiment, a partition loss may be computed for the hotspots based on the categorizing of the partitions.

In block 610, a total loss is computed as a weighted sum of the computed classification, regression, and partition losses.

In block 612, the total loss is backpropagated for adjusting one or more weights associated with the neural networks making up the OHS head.

In block 614, a determination is made as to whether the OHS head has been sufficiently trained. Training may end, for example, when the total loss stops decreasing after a certain number of iterations. If training is not finished, the process returns to block 600 to continue the training with, for example, additional training data.

Figure 7:
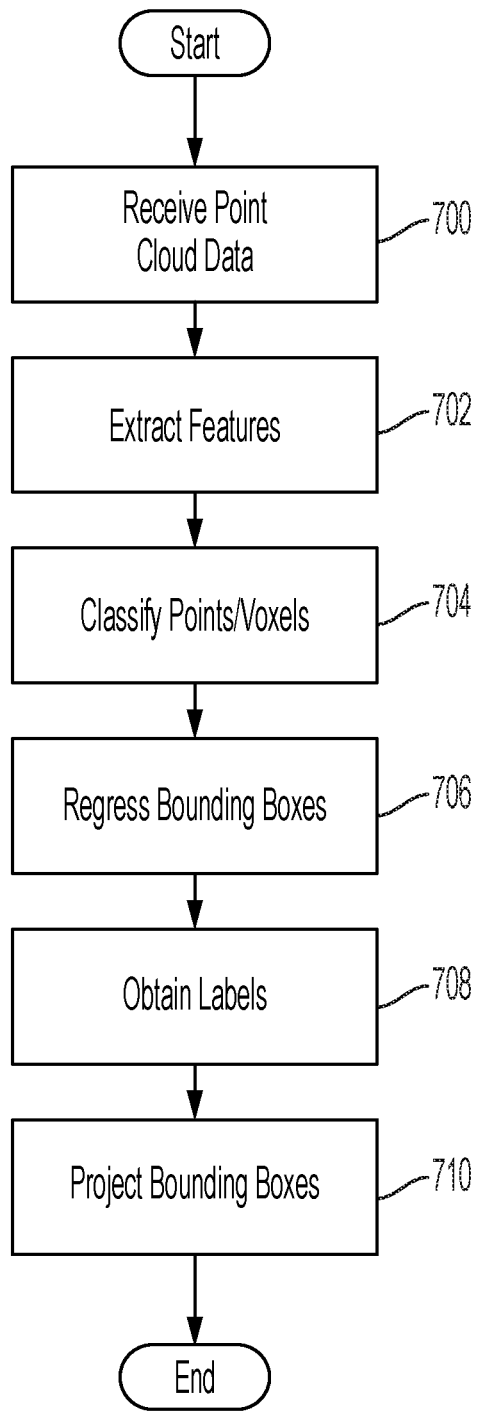
FIG. 7 is a flow diagram of a process for a single pass, anchor-free detection of 3D objects according to one embodiment.

FIG. 7 is a flow diagram of a process for a single pass, anchor-free detection of 3D objects according to one embodiment. In block 700, point cloud data including points in 3D space is received from an input source, such as, for example, the one or more sensors 102 on top of an autonomous vehicle.

In block 702, the raw point cloud data, or the voxelized version of the data, is provided to one or more neural networks, such as, for example, the backbone network 204, for extracting features from the point cloud data. One or more output feature maps may be generated based on the extracted features. An extracted feature map may include one or more neurons, where a particular neuron may be associated with one or more points or voxels.

In block 704, the shared convolutional network 206 and the hotspot classification subnet 208 are invoked for classifying the neurons as hotspots or not, for particular classes of objects. In this regard, the hotspot classification subnet 208 may calculate a probability/confidence value that a neuron in the extracted feature map is a hotspot for the various classes of objects. A neuron with a confidence value higher than a threshold may be classified as a hotspot for a particular object instance associated with a particular class. In one embodiment, if the particular object instance is associated with more than one hotspot, a hotspot with the highest confidence value may be selected for representing the object.

In block 706, a bounding box is regressed for a particular hotspot. The regressing of the bounding box may be similar to the regressing of the bounding box in block 606 of FIG. 6.

In block 708, labels and other types of annotation data for the object instance associated with the bounding box may be retrieved. Such labels/annotation data may include, for example, object classification ID, bounding box location coordinates and direction, and/or the like.

In block 710, the regressed bounding box is projected to the received point cloud space to mark the detected object. In one embodiment, an autonomous vehicle, such as the vehicle 100 of FIG. 1, may be controlled based on the regressed bounding box information.

It should be understood that the sequence of steps of the process in FIGS. 6 and 7 are not fixed, but may be altered into any desired sequence as recognized by a person of skill in the art. For example, the steps in blocks 604-608 may occur in a different order, or in parallel.

In some embodiments, the various modules 108-112, 118 discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium. A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for 3D object detection have been specifically described and illustrated herein, many modifications and variations will be apparent to those skilled in the art. Accordingly, it is to be understood that a system and method for 3D objection detection constructed according to principles of this disclosure may be embodied other than as specifically described herein. The disclosure is also defined in the following claims, and equivalents thereof.

What is claimed is:

1. A method for three-dimensional (3D) object classification comprising:
  receiving, by a computing system, point cloud data from an input source, wherein the point cloud data includes first and second points in 3D space, wherein the first point represents a feature of an object;
  transforming the point cloud data into a plurality of voxels, wherein a first voxel of the plurality of voxels includes the first point, and a second voxel of the plurality of voxels includes no points;
  invoking, by the computing system, a neural network for classifying the first point with a first label, wherein the classifying of the first point includes classifying the first voxel with the first label;
  classifying the second voxel with the first label or a second label different from the first label;
  regressing, by the computing system, a bounding box based on classifying the first point with the first label, wherein the regressing of the bounding box is based on at least the first voxel, and wherein the regressing the bounding box includes predicting at least a location of the bounding box; and
  controlling, by the computing system, an autonomous vehicle based on regressing the bounding box.

2. The method of claim 1, the method further comprising:
classifying the second voxel with the first label, wherein the regressing of the bounding box is based on the first voxel and the second voxel.

3. The method of claim 1 further comprising training the neural network based on training data, wherein the training data includes a particular point associated with the object, wherein the particular point is assigned the first label in response to detecting that the particular point is within a threshold distance to a center of the object.

4. The method of claim 3, wherein M number of points in the training data are assigned the first label, wherein M is determined based on a volume of the object.

5. The method of claim 1 further comprising training the neural network based on training data, wherein the training includes learning relative spatial information of two points assigned the first label.

6. The method of claim 5, wherein the learning of the relative spatial information includes:
dividing a ground truth bounding box associated with the object into partitions; and
classifying a particular point associated with the object and assigned the first label, to one of the partitions.

7. The method of claim 5, further comprising computing a partition classification loss, and training the neural network based on the partition classification loss.

8. The method of claim 7, wherein the training of the neural network is further based on a classification loss computed from classifying points with the first label, and a regression loss computed from bounding box regression of the classified points.

9. The method of claim 1, wherein the regressing of the bounding box includes applying soft argmin for regressing location parameters associated with the first point.

10. A system for three-dimensional (3D) object classification comprising:
a processor; and
a memory, wherein the memory stores instructions that, when executed, cause the processor to:
receive point cloud data from an input source, wherein the point cloud data includes first and second points in 3D space, wherein the first point represents a feature of an object;
transform the point cloud data into a plurality of voxels, wherein a first voxel of the plurality of voxels includes the first point, and a second voxel of the plurality of voxels includes no points;
invoke a neural network for classifying the first point with a first label, wherein the classifying of the first point includes classifying the first voxel with the first label;
classify the second voxel with the first label or a second label different from the first label;
regress a bounding box based on classifying the first point with the first label, wherein the instructions that cause the processor to regress the bounding box include instructions that cause the processor to regress the bounding box based on at least the first voxel, and wherein the instructions that cause the processor to regress the bounding box is for predicting least location of the bounding box; and
control an autonomous vehicle based on regressing the bounding box.

11. The system of claim 10, wherein the instructions further cause the processor to:
classify the second voxel with the first label, wherein the instructions that cause the processor to regress the bounding box include instructions that cause the processor to regress the bounding box based on the first voxel and the second voxel.

12. The system of claim 10, wherein the instructions further cause the processor to:
train the neural network based on training data, wherein the training data includes a particular point associated with the object, wherein the particular point is assigned the first label in response to detecting that the particular point is within a threshold distance to a center of the object.

13. The system of claim 12, wherein M number of points in the training data are assigned the first label, wherein M is determined based on a volume of the object.

14. The system of claim 10, wherein the instructions further cause the processor to:
train the neural network based on training data, wherein the training includes learning relative spatial information of two points assigned the first label.

15. The system of claim 14, wherein the instructions that cause the processor to learn the relative spatial information include instructions that cause the processor to:
divide a ground truth bounding box associated with the object into partitions; and
classify a particular point associated with the object and assigned the first label, to one of the partitions.

16. The system of claim 14, wherein the instructions further cause the processor to compute a partition classification loss, and train the neural network based on the partition classification loss.

* * * * *